United States Patent [19]
Goodfellow

[11] Patent Number: 5,203,937
[45] Date of Patent: * Apr. 20, 1993

[54] MANUFACTURE OF A REINFORCED TUBULAR ARTICLE

[75] Inventor: Anthony G. Goodfellow, Liverpool, United Kingdom

[73] Assignee: Bridgestone/Firestone Inc., Akron, Ohio

[ * ] Notice: The portion of the term of this patent subsequent to May 19, 2009 has been disclaimed.

[21] Appl. No.: 566,397

[22] PCT Filed: Mar. 13, 1989

[86] PCT No.: PCT/GB89/00260
§ 371 Date: Aug. 22, 1990
§ 102(e) Date: Aug. 22, 1990

[87] PCT Pub. No.: WO89/08546
PCT Pub. Date: Sep. 21, 1989

[30] Foreign Application Priority Data

Mar. 12, 1988 [GB] United Kingdom ............... 8805924

[51] Int. Cl.$^5$ ................. B29D 30/30; B29C 53/42
[52] U.S. Cl. .................. 156/133; 156/123; 156/174; 156/184; 156/405.1; 198/803.01
[58] Field of Search ............... 156/174, 111, 184, 123, 156/130, 130.7, 133, 134, 135, 405.1, 406.4, 447, 558, 566, 512, 264, 229; 271/184, 185, 225; 198/803.01, 803.2, 465.2

[56] References Cited

U.S. PATENT DOCUMENTS

| | | | |
|---|---|---|---|
| 2,726,185 | 12/1955 | Howalo . | |
| 2,982,667 | 5/1961 | Ness et al. | 156/229 |
| 3,236,711 | 2/1966 | Adler | 156/174 |
| 4,398,988 | 8/1983 | Mullender | 156/405.1 |
| 4,659,417 | 4/1987 | Yamamoto | 156/405.1 |
| 4,783,230 | 11/1988 | Perkins | 156/174 X |
| 4,877,468 | 10/1989 | Siengenthaler | 156/111 |

FOREIGN PATENT DOCUMENTS

3712263 10/1988 Fed. Rep. of Germany .
93345 5/1984 Japan ............... 156/406.4

Primary Examiner—Geoffrey L. Knable
Attorney, Agent, or Firm—Sughrue, Mion, Zinn, Macpeak & Seas

[57] ABSTRACT

A method for the manufacture of a reinforced tubular article involves forming at a first work station (14) a first flexible reinforced tubular structure in which at least one reinforcing element extends generally circumferentially, e.g. helically. The first tubular structure is cut transversely to form cut edges (17, 18) and then transported, typically as a flat sheet, by means of a carrier (15) to a second work station (25, 26) at which it is formed into a second reinforced tubular structure in which the cut edges (17, 18) extend generally circumferentially. Thus there is provided, by the method of the invention, a second reinforced tubular structure in which the reinforcing element(s) of the first tubular structure is or are re-orientated to extend in a substantially longitudinal direction of the tubular structure.

15 Claims, 8 Drawing Sheets

MANUFACTURE OF A REINFORCED TUBULAR ARTICLE

This invention relates to a method of manufacture of a reinforced tubular article and in particular, although not exclusively, to the manufacture of a flexible reinforced tubular article such as a pneumatic tire, suspension diaphragm or flexible reinforced tubular component for such an article. The invention provides also a reinforced tubular article such as a pneumatic tire, suspension diaphragm or component for such an article manufactured by the method of the present invention.

A flexible reinforced tubular article such as a pneumatic tire comprises a large number of component parts and the quality of the finished article is related to the ease and accuracy with which these parts may be constructed and handled during the stages of manufacture.

The present invention seeks to provide in accordance with one of its aspects an improved method for the manufacture of a reinforced tubular article.

In accordance with one of its aspects the present invention provides that in a method for the manufacture of a reinforced tubular article comprising forming at a first work station a flexible tubular reinforcement structure comprising a layer of polymeric material having at least partially embedded therein at least one reinforcing element, cutting said flexible tubular reinforcement structure transversely between the axial ends of the structure when at the first work station to provide a pair of transverse edges and winding the flexible reinforcement structure into a substantially tubular form in which said transverse edges extend substantially in the circumferential direction at a second work station, said flexible reinforcement structure is fed onto a carrier at the first work station and transported from the first to the second work station whilst supported by the carrier and maintained in accurate location on the surface of the carrier and maintained in an accurate stationary location relative to the surface of the carrier.

The flexible tubular reinforcement structure may be cut transversely in a direction substantially parallel with the longitudinal direction of the tubular structure at said work station.

The flexible tubular reinforcement structure at the first work station may comprise at least one reinforcing element wound to extend helically and/or it may comprise a plurality of reinforcing elements each of which extends substantially circumferentially as a reinforcing ring in the tubular structure.

The reinforcing element may comprise, for example, a single monofilament or a plurality of filaments arranged as a cord or cable and said reinforcing element may be of a metallic or textile material or other reinforcing material such as Kevlar or glass.

The polymeric material may be a material such as uncured natural or synthetic rubber.

Use may be made of a carrier of a type which is extensible to permit extension of the flexible reinforcement structure whilst supported by the carrier, and of a carrier which is selectively extensible whereby some portions of the flexible reinforcement structure may be subject to greater extension than other portions.

The method may comprise use of a carrier which is flexible and in which a flexible carrier can be flexed to adopt a tubular form at the second work station. The carrier may be used to guide the flexible reinforcement structure at the second work station whereby the reinforcement structure is disposed between the carrier and a former.

The method may comprise subjecting the flexible reinforcement structure to compression at the second work station. The carrier and former may be moved relative to one another at the second work station to compress the flexible reinforcement structure therebetween. Compression may be achieved by use of an expansible or contractible former and/or an expansible or contractible carrier.

Preferably said polymeric material, at least when at the first and second work stations and during transport therebetween, is a material which inherently tends to adhere to surfaces at the first and second work stations and the carrier.

Particularly, but not necessarily only, if the polymeric material does not tend inherently to adhere to surfaces of the first and second work stations and the carrier, at least some of said surfaces may be provided with retention means such as vacuum retention means to facilitate accurate locations of the flexible reinforcement structure.

Particularly, but not necessarily only, if the polymeric material tends inherently to adhere to surfaces of the first and second work stations and the carrier, at least one of said surfaces may be provided with means operable to urge the flexible reinforcement structure away from that surface.

In accordance with another of its aspects the present invention provides a reinforced tubular article, which may be a flexible reinforced tubular article, manufactured by a method in accordance with the present invention.

Embodiments of the present invention will now be described, by way of example only, with reference to the accompanying diagrammatic drawings, in which.

One embodiment of a method of manufacturing a pneumatic tire of the radial ply type is now described with reference to FIGS. 1-13 of the accompanying drawings.

A flexible carrier 15 for transportation of a ply of cord-reinforced flexible sheet material 9 between two work stations comprises a plurality of rigid hollow section slats 10 arranged in a parallel side-by-side relationship and interconnected by chains 13. The flexibility of the chains combined with the rigidity of the slats results in a flexible carrier which can be rolled upon itself about an axis perpendicular to the plane of FIG. 1 but which is substantially rigid to resist deformation about an axis extending across FIG. 1 in the plane thereof.

Figure 1:
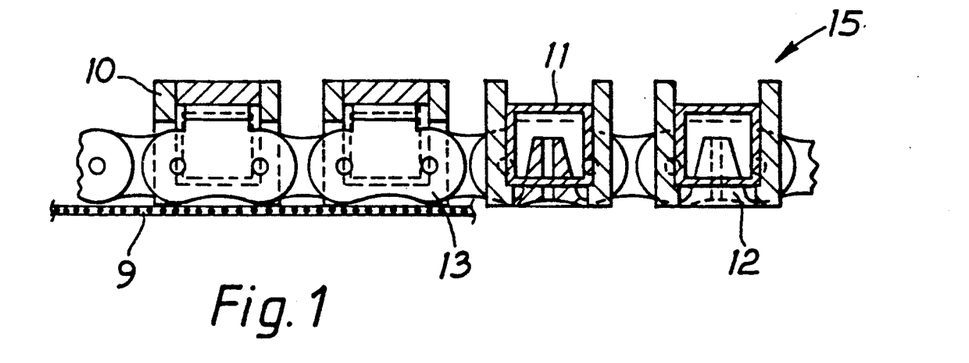
FIG. 1 shows partly in longitudinal section a part of a flexible carrier of a handling means for use in a method in accordance with the present invention.
Figure 2:
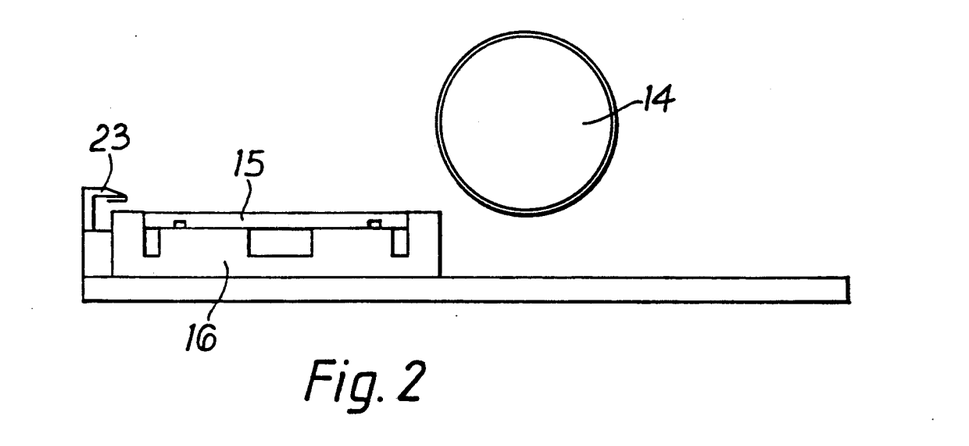
FIGS. 2-4 show part of the operation of the handling means to transfer sheet material to the flexible carrier at a first work station.
Figure 3:
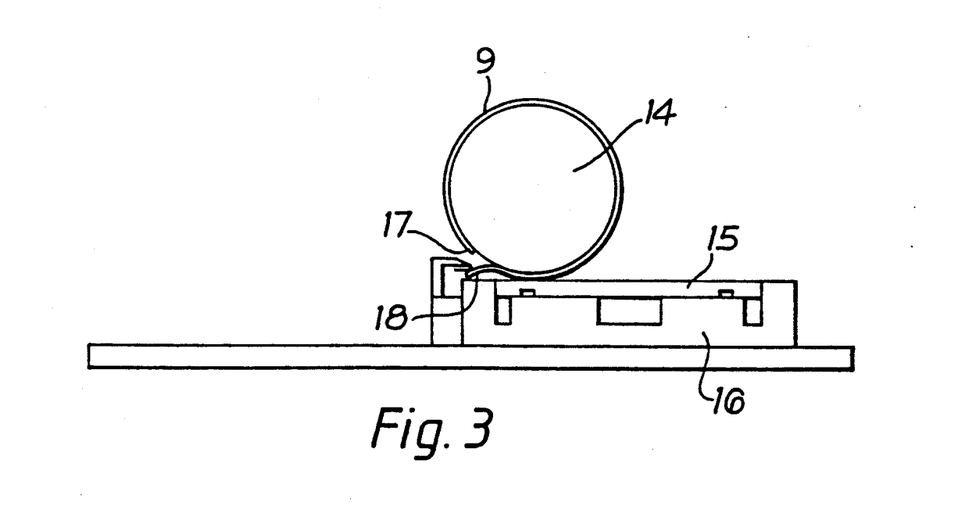
Figure 4:
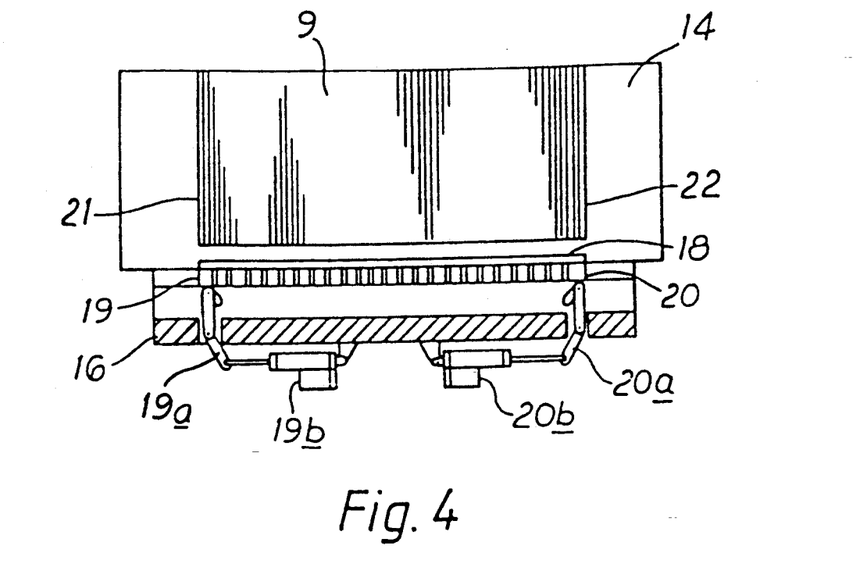

Each slat 10 houses a vacuum manifold which communicates with a plurality of vacuum suction cups 12 provided at a support surface of the carrier, being a lower surface of the carrier as shown in FIG. 1 in which the carrier is in an inverted condition.

The left-hand portion of FIG. 1 shows the carrier 15 in use to support a piece a flexible reinforced ply sheet material 9, the material being held securely to the carrier support surface by a vacuum acting through the cups 12.

The slatted carrier 15 is accurately located and supported by a carriage 16. One edge of the carriage is provided with ply clamp means 23 the function of which will be described below. The slats extend transversely relative to the length of the carrier.

As supported by the carriage 16, the slatted carrier 15 is movable in two mutually perpendicular directions X, Y (see FIGS. 5 and 6) between a first work station comprising mandrel 14 and a second work station comprising former 25.

In the direction X the carriage and carrier are movable in unison to and from the mandrel 14 by drive means not shown. In the direction Y the carrier is movable over the carriage to and from the former 25 also by drive means not shown. For this purpose the carriage is provided with guidance grooves 16a, 16b, 16c in which carrier support wheels (not shown) are located and guided.

The mandrel 14 is of a kind around which there has been formed, for example by helical winding, a layer of flexible elastomeric material having at least one helically extending reinforcing cord either wholly or partially embedded therein. The tubular layer of ply fabric is cut substantially parallel with the axis of rotation of the mandrel to provide a pair of cut edges 17, 18.

To transfer the ply fabric from the mandrel to the carrier 15 the carrier 15 and carriage 16 are moved in unison toward the mandrel 14 in the direction of arrow X. The positioning of the carrier relative to the mandrel in the direction Y is carefully controlled by position sensing and control means, not shown but of conventional type, prior to movement in the direction X thereby to ensure that when the carrier 15 comes toward the mandrel the carrier lies substantially centrally relative to the width of the ply fabric carried by the mandrel.

A final alignment operation ensures that the edges 21, 22 of the ply fabric are aligned precisely with the end edges 19, 20 of the carrier. This alignment operation utilises control arms 19a, 19b to move the slats sideways within the tolerance provided by the pin clearances in the carrier chains 13. (The control arms 19a and 20a, and the associated drive means 19b, 20b are positioned to lie within the central carriage groove 16b). The leading edge 21 is first aligned precisely relative to the end edge 19 of the carrier and the carrier end edge 20 is then finely adjusted for accurate alignment with the ply fabric edge 22.

Having precisely aligned the respective edges 19, 20, 21, 22 of the fabric and carrier the clamp 23 is operated to grip the cut edge 18 of the ply fabric 9 and hold that edge on the carrier. Transfer of the ply fabric 9 from the mandrel to the carrier is then completed by rotating the mandrel 14 slowly, in a clockwise direction as viewed in FIGS. 2 and 3, concurrent with linear movement of the carriage as the latter returns from underneath the mandrel to the relative positioning shown in FIG. 2. If the ply fabric does not tend inherently to adhere to the mandrel 14 the mandrel may be provided with vacuum or like retention means to ensure proper support for the fabric as it is unwound onto the carrier. Vacuum is applied through the suction cups 12 to retain the ply fabric assembly positioned on the carrier.

Figure 5:
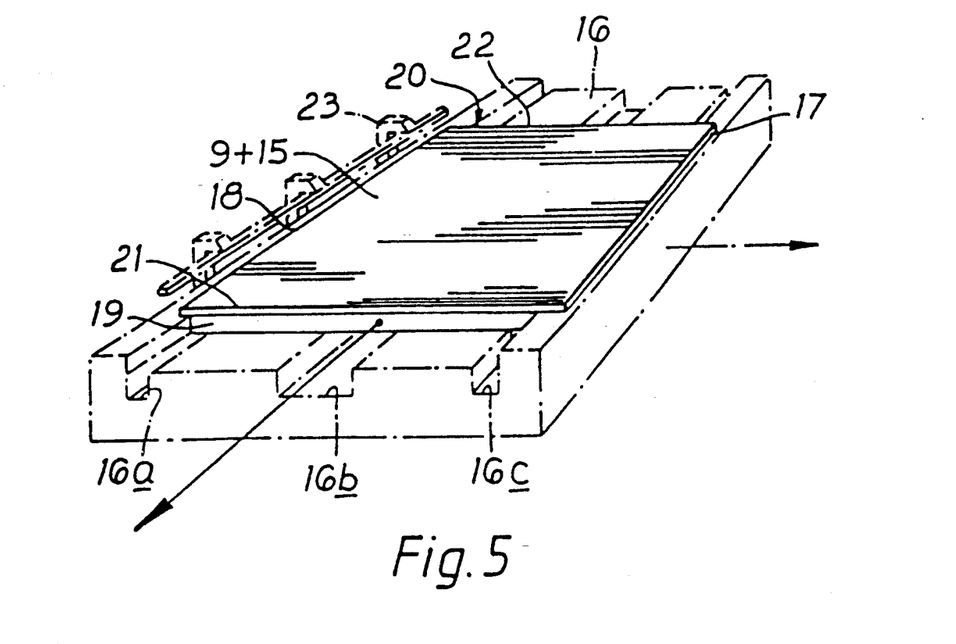
FIGS. 5-8 show stages in the transfer of sheet material from the first to a second work station.

When the transfer is complete the ply is held firmly and positioned accurately on the carrier 15 in the manner shown in FIG. 5.

The carrier thus supports a sheet of ply fabric of a kind which as unwound from the mandrel comprises a reinforcement of a plurality of parallel cords.

From FIG. 5 it will be seen that in this embodiment of the invention the cut edges 17, 18 of the ply fabric overhang the ends of the slats. This arises because the circumferential length of the ply fabric 9 on the mandrel 14 is arranged to be greater than the slat length and the purpose of this will be described below.

Figure 6:
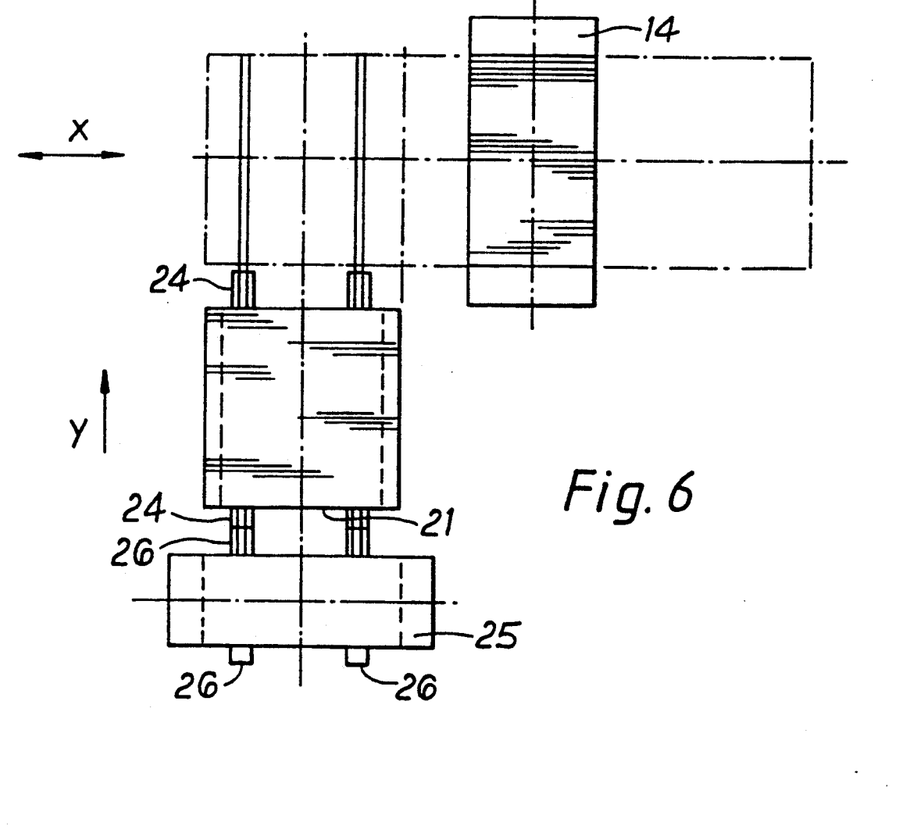
Figure 7:
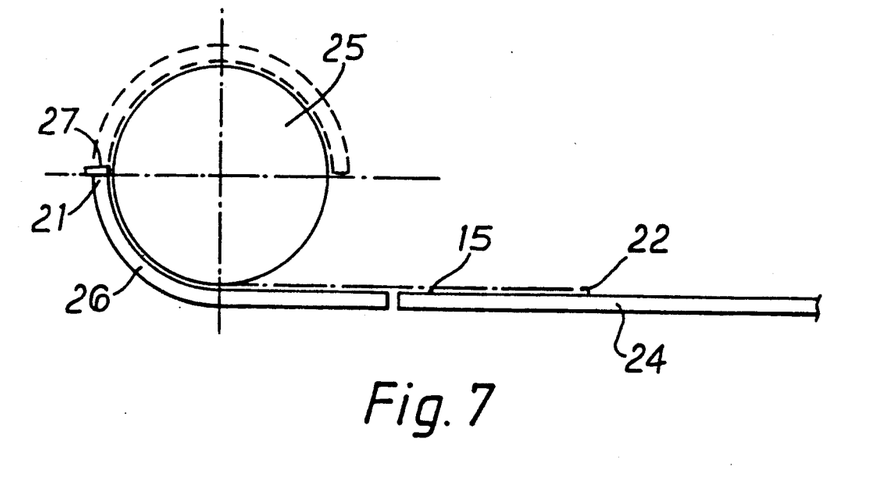

To continue the process of tire manufacture, the accurately positioned ply and carrier are transported along a carriage guide track 24 to a second work station where an already prepared building former 25 and carrier guide system 26, which aligns with the guide tracks 24, facilitates alignment and assembly of the ply onto the former 25 (see FIGS. 6 and 7). The former is of a cylindrical shape and the width of the ply fabric 9 when on the mandrel 14 is selected to correspond closely with the circumferential length of the former in this embodiment in which the material on the mandrel 14 is to be cut longitudinally. (If the material on the mandrel were to be cut transversely other than in the longitudinal direction, e.g. helically relative to the longitudinal axis of the mandrel, the length of that cut should correspond closely with the circumferential length of the former).

The conveying direction Y to the former 25 results in the edge 21 of the ply fabric becoming the leading edge. The carrier moves into support by the guide system 26 to a prescribed position at which the now leading edge 21 is gripped and held by clamps 27 contained within the mechanism of guide system 26 (see FIG. 7). The former is of a cylindrical shape and the width of the ply fabric 9 when on the mandrel 14 is selected to correspond closely with the circumferential length of the former.

The conveying direction Y to the former 25 results in the edge 21 of the ply fabric becoming the leading edge. The carrier moves into support by the guide system 26 to a prescribed position at which the now leading edge 21 is gripped and held by clamps 27 contained within the mechanism of guide system 26 (see FIG. 7).

Figure 8:
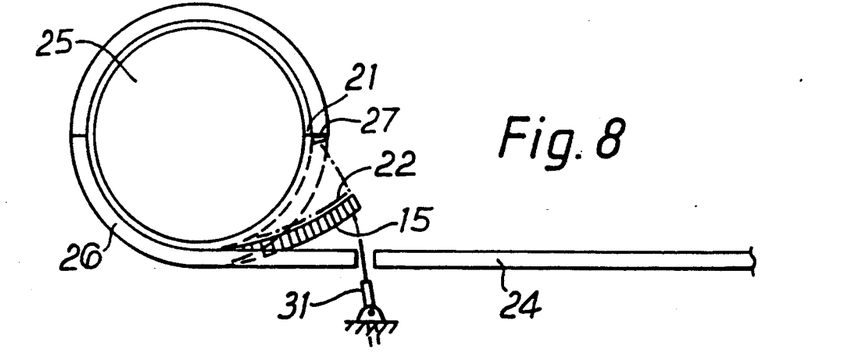

An upper portion of guide system 26 extends through a semi-circular path thereby to position edge 21 such that it can be manipulated to form an invisible joint when the trailing edge 22 of the ply fabric is brought upwards and round, supported on the carrier, to complete encirclement of the former as shown in FIG. 8.

Figure 9:
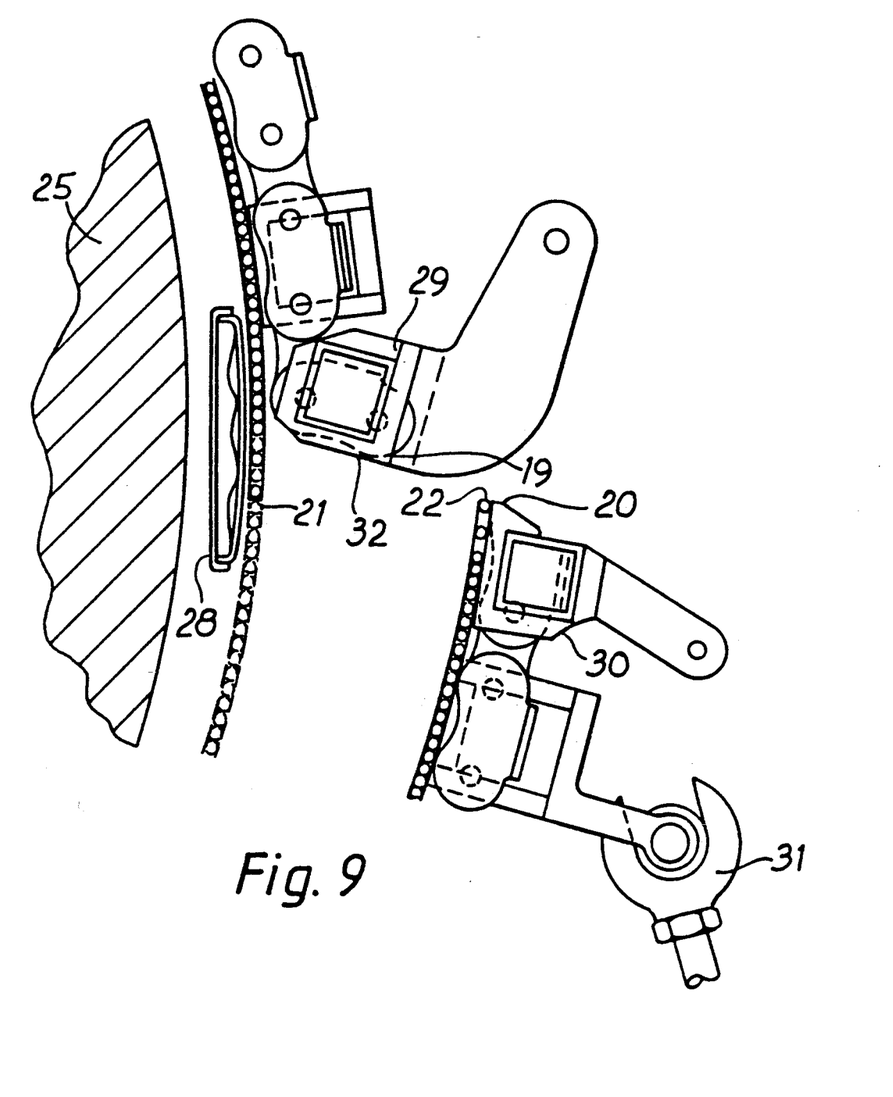
FIGS. 9-11 show details of carrier holding means operable at the second work station.
Figure 10:
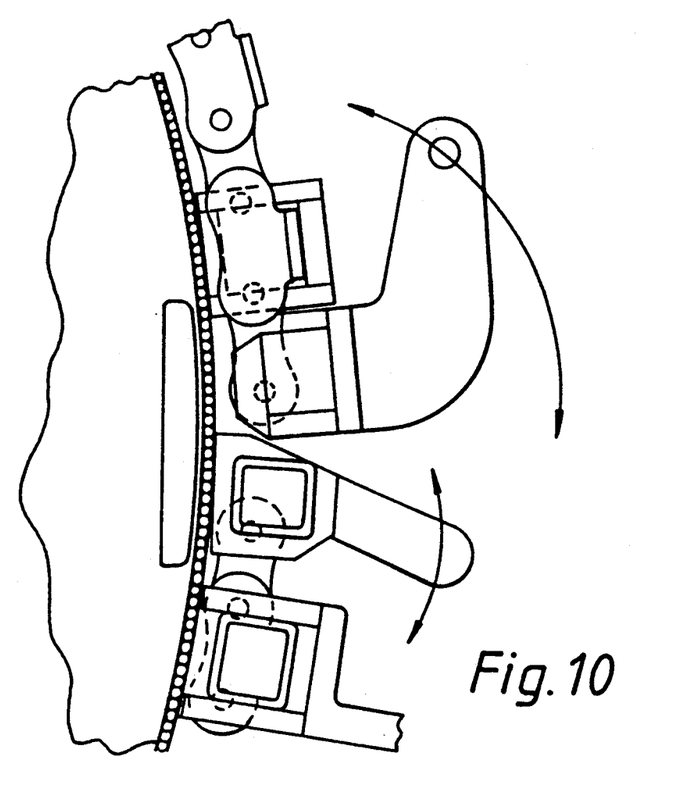
Figure 11:
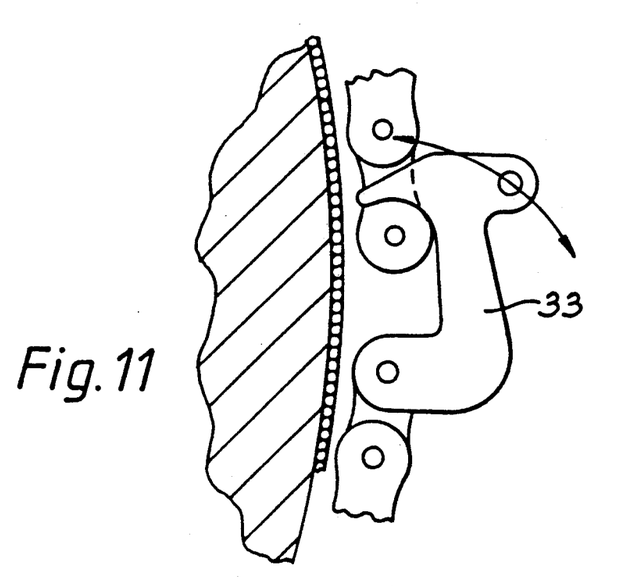

Joining of the ends 19, 20 of the carrier will now be described with reference to FIGS. 9 and 10. As the clamps 27 draw the leading edge 21 of the carrier to the position shown in FIG. 8 a holding finger 28 extends axially between the former 25 and the guide system. The finger 28 is then moved radially outwards to contact and support the exposed face of the ply end 21 which is held and supported by the leading end 19 of carrier 15. The finger 28 may incorporate a vacuum facility for retention of ply fabric and/or a pressure facility to cause ply fabric to lift from the finger. In FIG. 9 the end 19 is shown as part of end slat 29 and end 20 as part of slat 30. The vacuum holding action of these slats can be separately controlled so that when finger 28 has hold of ply edge 21 the holding action of slat 29 can be released and slat 29 rotated in a direction so as to expose the ply edge 21.

In FIGS. 8 and 9 the guide track closing mechanism 31 is shown lifting end slat 30 in an involute path so as to cause end 20 to contact guiding face 32 of slat 29 which is exposed and positioned when slat 29 is rotated. The end 20 can then be guided, in one continuous motion, by face 32 to move the ply edge 22 into, for example, an overlapping contact with the exposed edge 21 and apply a joining force which is resisted by the finger 28. The joint is then completed with mechanism lying as shown in FIG. 10.

Preferably end slat 30 is also rotated to expose the completed joint so that a consolidating roller (not shown) can traverse the joint to ensure that it is firmly held together over its entire length.

The joining process is completed by the slat 30 being returned to contact and hold the joint while latches 33 (see FIG. 11) are operated to cause the carrier to become a continuous hoop. The finger 28 is then removed so that former 25 can expand radially and cause components which have been pre-applied to the former to contact the ply.

The carrier is then in a condition to provide the means of positioning the tire beads. If conventionally produced tire beads and apexes are employed these may be fitted and held to the ends of the now continuous support tube formed by the carrier before the former is expanded against the inside of the support tube. By virtue of the aforedescribed feature of the cut edges 17, 18 of the ply fabric overhanging the ends of the slats the overhanging ends can be turned radially outwards around the beads, thereby to assist in locating the beads and resisting their subsequent axial separation.

Figure 12:
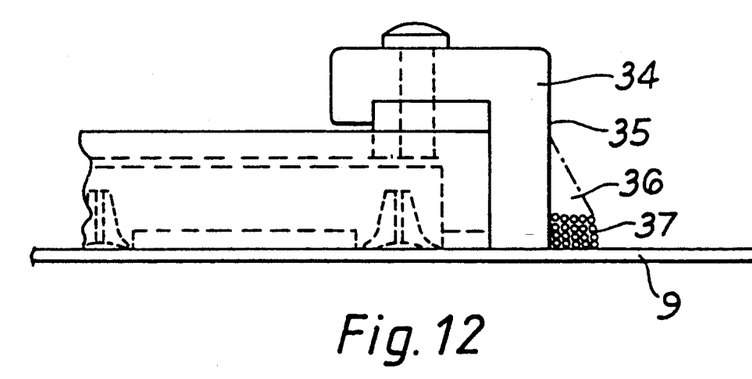
FIGS. 12-14 show details of the assembly of tire bead formations at the second working station.

FIG. 12 illustrates another method of providing and positioning the beads. Each bead 36 and apex 37 can be wound against a respective edge of the continuous support tube after the former has expanded. In this process the slats are fitted with special brackets 34 to create a supporting face 35 against which the bead 36 and apex 37, or bead and apex assembly, can be wound.

Figure 13:
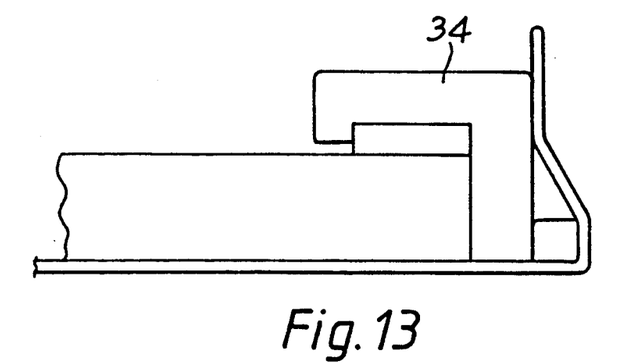

FIG. 13 illustrates the benefit gained during the turning up operation by leaving the carrier with brackets 34 in situ so that the length of reinforcing cords of the ply which is locked around the beads is precisely defined and the brackets 34 provide an anvil against which the ply turn-up can be consolidated.

When the consolidation has been completed the use of the carrier is virtually complete if the type of former in use is one which is capable of providing the means of inflating the carcass into its final toroidal form. The carrier can then be removed to perform another cycle of operation. If however the former used does not have the means to inflate the carcass the carrier can perform yet another function by holding the carcass in its now tubular form while the former is exchanged for one which can perform the inflation operation before the carrier is removed from the outer surface of the carcass.

Figure 14:
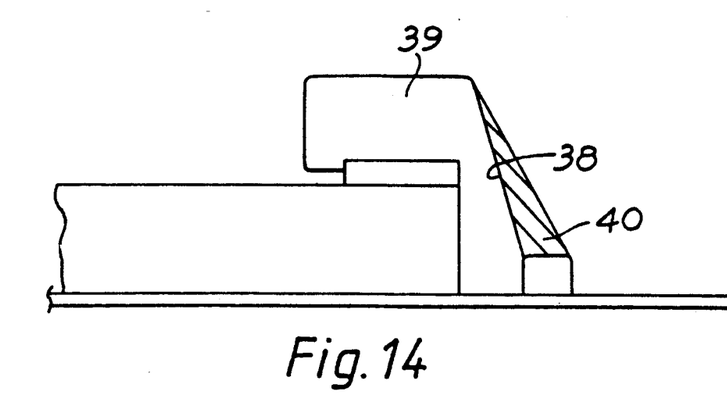

FIG. 14 illustrates a yet further method for providing and positioning the beads. The bracket 39 has an inclined surface 38 whereby a circumferentially extending series of the brackets define a frusto-conical surface against which an inwardly inclined bead apex region 40 may be formed. The flexibility of the apex in the finished assembly allows removal of the carrier.

Figure 15:
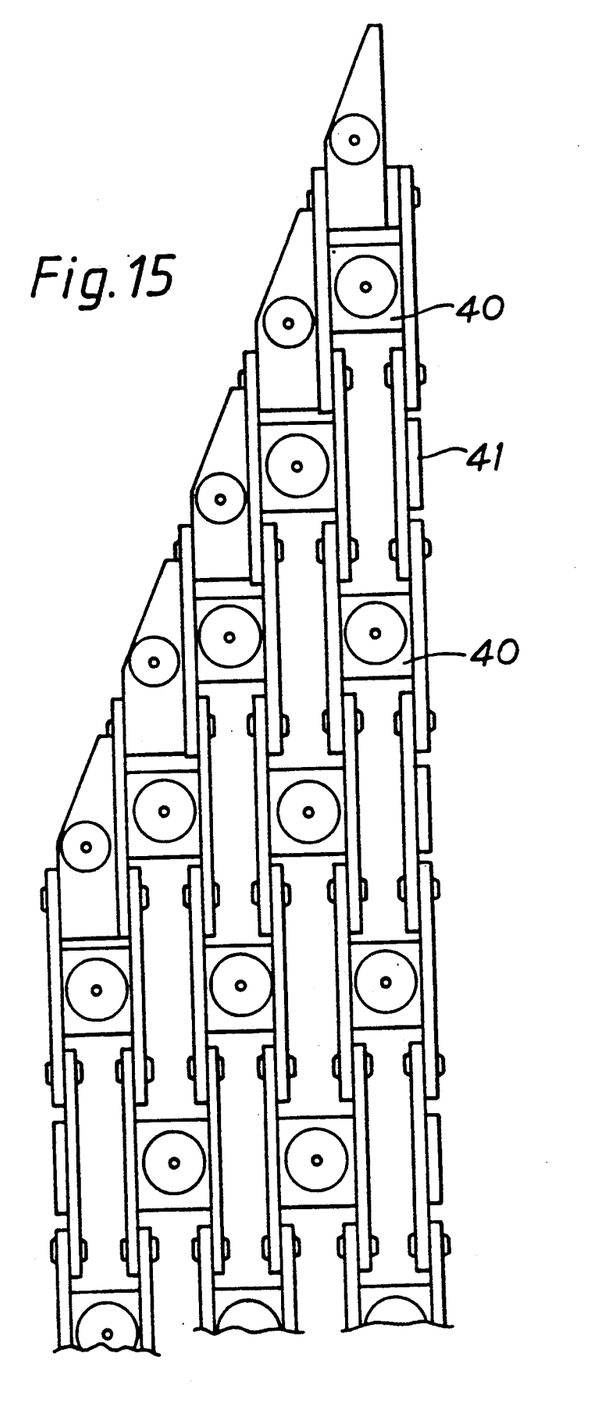
FIG. 15 is a plan view of part of a flexible carrier of another handling means for use in a method in accordance with the present invention, and FIGS. 16a and 16b respectively show side and plan views of a flexible carrier of handling means for use in a method in accordance with a further aspect of the present invention.

FIG. 15 illustrates another form of the carrier described as a chain mat and comprising a staggered array of blocks 40 interconnected by chain links 41. This form of carrier is most useful for handling reinforced components which have a parallelogram shape such as used in cross-ply tires or suspension units or breaker plies of radial tires. The carrier can be used substantially in the same manner as described for the aforedescribed slatted version. It can also be contorted in an angular plane so that the vacuum pick-off and application processes can be achieved in a circular path different from the angle of any reinforcing cords contained in the supported sheet material.

Figure 16A:
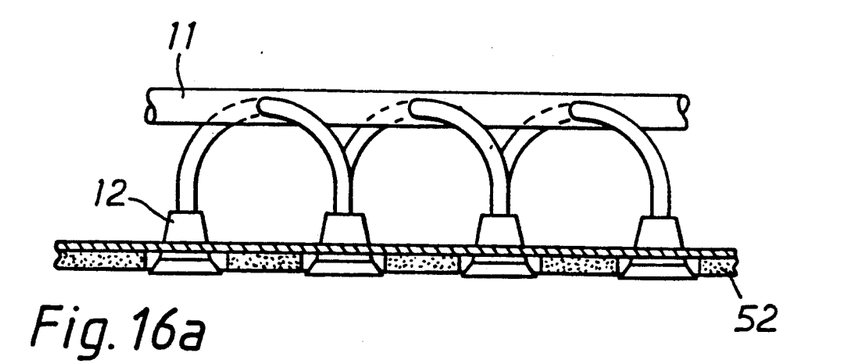
Figure 16B:
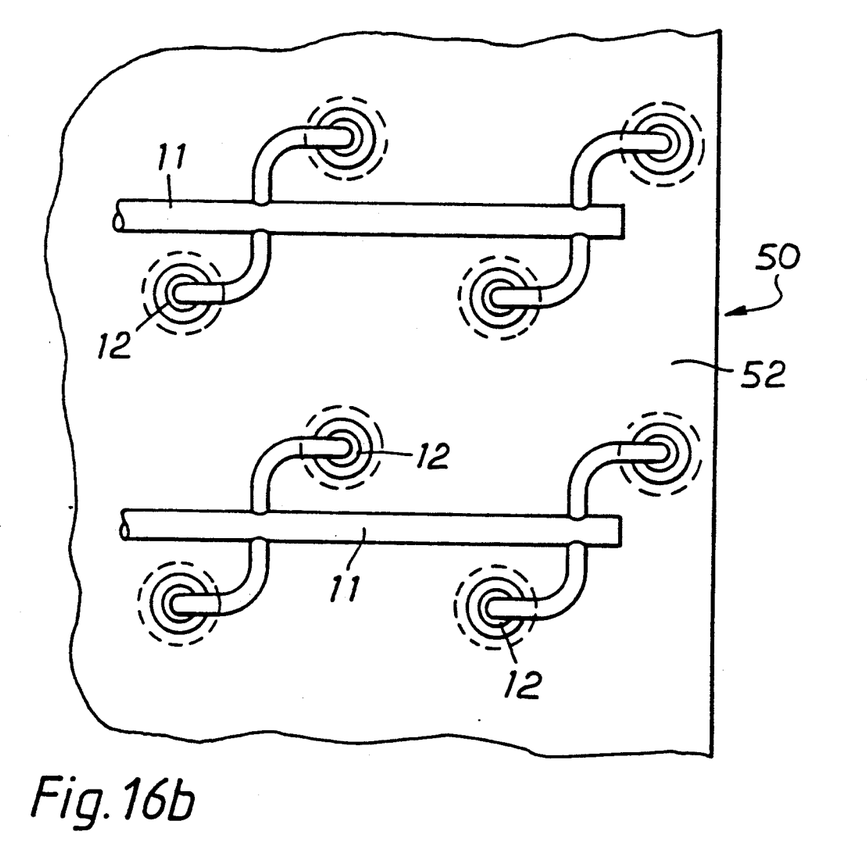

FIG. 16 illustrates yet another form of the carrier 50 which has instead of or in addition to its proprietary vacuum cups 51 a vacuum support system which covers an area extending to the shape of the sheet material component to be carried by the carrier. This form of carrier can use, for example, reticulated flexible foamed plastics material 52 in contrast to the aforedescribed slats or blocks and can be used to provide support for sheet material over the whole of its surface.

I claim:

1. A method for the manufacture of a reinforced tubular article, comprising forming at a first work station a flexible tubular reinforcement structure comprising a layer of polymeric material having at least partially embedded therein at least one reinforcing element, cutting said flexible tubular reinforcement structure transversely between the axial ends of the structure when at the first work station to provide a pair of transverse edges, feeding said flexible reinforcement structure onto a carrier at the first work station for transport thereon to a second work station, transporting the flexible reinforcement structure from the first to the second work station whilst supported by the carrier and maintained in an accurate stationary location relative to the surface of the carrier and winding the flexible reinforcement structure at a second work station into a substantially tubular form in which said transverse edges extend substantially in the circumferential direction.

2. The method claimed in claim 1, wherein at the first work station the flexible tubular reinforcement structure is cut transversely in a direction substantially parallel with the longitudinal direction of the tubular structure at said first work station.

3. The method claimed in claim 1, wherein the flexible tubular structure at the first work station comprises at least one reinforcing element wound to extend helically in the tubular structure.

4. The method claimed in any one of the preceding claims, wherein the flexible tubular reinforcement structure at the first work station comprises a plurality of reinforcing elements which extend substantially circumferentially in the tubular structure.

5. The method claimed in claim 1, wherein said carrier is a flexible carrier.

6. The method claimed in claim 5, wherein the carrier adopts a tubular form at the second work station.

7. The method claimed in claim 6, wherein end portions of the carrier are interconnected when the carrier is in a tubular form at the second work station.

8. The method claimed in claim 5, wherein the carrier guides the flexible reinforcement structure at the second work station whereby the reinforcement structure is disposed between the carrier and a former.

9. The method claimed in claim 8, wherein the carrier and former are moved relative to one another at the second work station to compress the flexible reinforcement structure therebetween.

10. The method claimed in claim 1, wherein the polymeric material is a material which inherently tends to adhere to surfaces at the first and second work stations and the carrier.

11. The method claimed in claim 1, wherein said carrier has retention means to facilitate accurate location of the flexible reinforcement structure on the carrier.

12. The method claimed in claim 1, wherein said carrier has means which is operable to urge the flexible reinforcement structure away from the carrier at the second work station.

13. The method claimed in claim 1, wherein the carrier is mounted on a carriage for movement therewith in a first direction and movement relative thereto in a second direction whereby the carrier moves in each of said first and second directions as it transports the flexible reinforcement structure from the first to the second work station.

14. The method claimed in claim 13, wherein the carrier is movable relative to the carriage in a direction which transports the flexible reinforcement structure to a position for winding into a substantially tubular form at the second work station.

15. The method claimed in claim 1, wherein said reinforced tubular article is a flexible reinforced tubular article for forming part of a pneumatic tire.

* * * * *